United States Patent Office 3,803,287
Patented Apr. 9, 1974

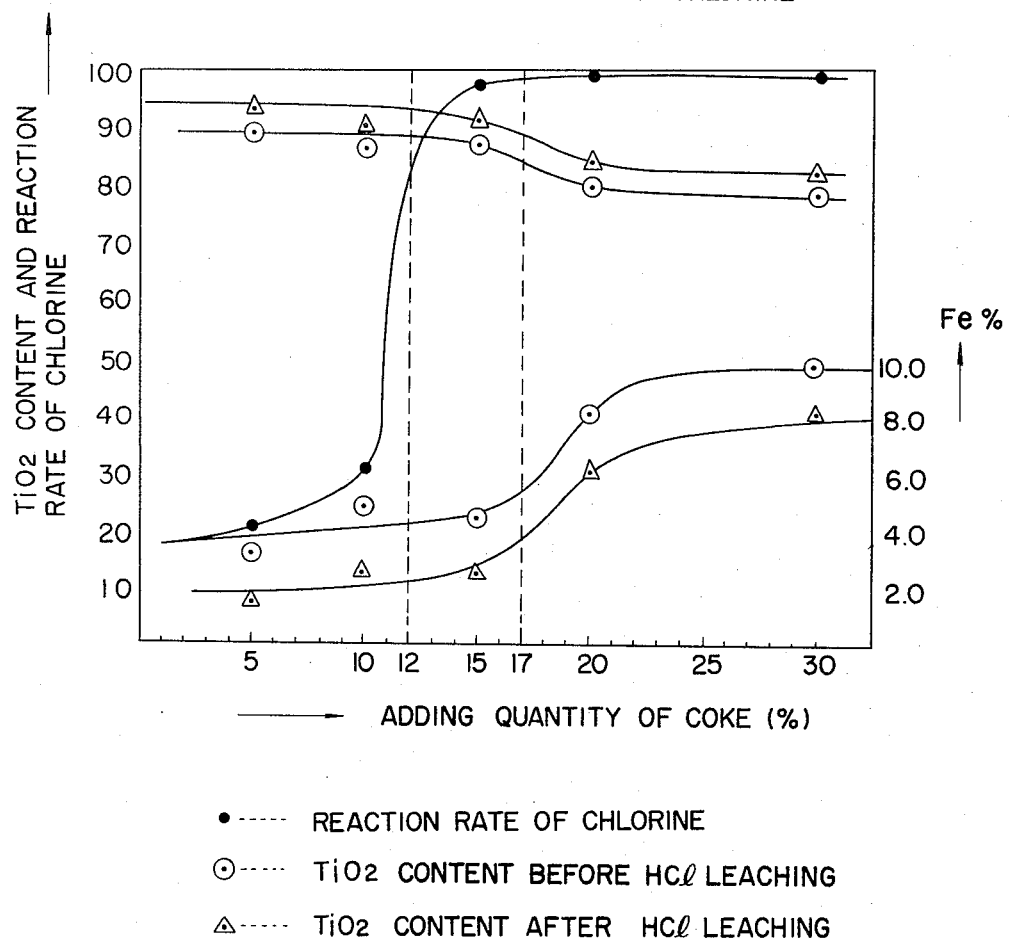

3,803,287
METHOD FOR PRODUCING TITANIUM CONCENTRATE
Seitaro Fukushima, Oomiya, and Hideya Imabayashi, Yono, Japan, assignors to Mitsubishi Kinzoku Kogyo Kabushiki Kaisha, Tokyo-to, Japan
Filed Apr. 6, 1972, Ser. No. 241,579
Claims priority, application Japan, Apr. 7, 1971, 46/21,076; Apr. 8, 1971, 46/21,350
Int. Cl. C22b 1/00; C01g 23/04
U.S. Cl. 423—74          7 Claims

ABSTRACT OF THE DISCLOSURE

An improved method of producing titanium concentrate from titanium-containing ore such as ilmenite, wherein oxidation-roasted ore is chlorinated to remove the iron content in the ore, after which the chlorinated ore is leached with diluted acid followed by separation of impurities still remaining in the leached residue.

---

This invention relates to a process for producing concentrated titanium ore in an economical and efficient manner, by a combination of two process steps, i.e., a process wherein chlorine is caused to react with a titanium ore containing iron such as, for example, ilmenite, thereby to preferentially chlorinate and evaporate the iron content: and another process wherein impurities other than titanium dioxide remaining in the titanium ore are removed by washing or flotation treatment thereof.

A number of methods have heretofore been proposed for titanium concentration process of ilmenite. Among these are a method wherein alkali metal salt is used; a method of liquid-to-liquid extraction; a method of leaching the ore by ferric salt; a method wherein sulfur or sulfite is used; a method wherein sulfate is used; a method wherein sulfuric acid is used; a method wherein hydrogen chloride gas is used; a method wherein hydrochloric acid is used; a method by reducing the ore into metallic iron in solid state; a method by slag formation; and a chlorination method. All of these have some merits and demerits, and none of them, except for the slag formation method, have been known to be put into practical use. Even the slag formation method fas a limitation in the resulting grade of titanium concentrate and it is not easy to concentrate the ore up to a level of 95% $TiO_2$ content.

In the chlorination method which is pertinent to the present invention, there has been proposed a titanium concentration method wherein iron content in the ore is preferentially chlorinated and evaporated by a chlorinating agent such as chlorine or hydrogen chloride gas in the presence of a reducing agent such as coke or carbon monoxide. Since this method utilizes a fluidized furnace or shaft furnace for the chlorination reaction, a very compact equipment will suffice and the concentration of titanium is advantageously high. This method, however, has not been put into practical use because many technical and economic problems exist, especially: difficulty in efficiently recovering chlorine from the evaporated iron chloride; difficulty in imparting preferential reactivity to iron and titanium with respect to chlorine, while causing chlorine to react efficiently; difficulty in maintaining long life of the equipment due to the severe corrosiveness of chlorine at high temperature; and difficulty in stable and continuous operation of the chlorination furnace.

It is therefore the primary object of the present invention to provide an improved method for producing a rutile substitute containing about 95% titanium dioxide in an economical manner and without the technical difficulties encountered in the heretofore known methods.

It is another object of the present invention to provide an improved method for obtaining titanium concentrate from titanium containing ore by first removing through preferential chlorination and evaporation the major portion of impurities such as iron, silica, alumina, etc. in the titanium ore under such conditions that the reactivity and selectivity of chlorine with respect to iron ore are compatible at a high level and easy operations can be secured, and then removing unreacted silica and alumina as well as residual iron content after the chlorination process by means of a convenient and well-known treatment such as washing, ore dressing, and so forth.

The above object of the present invention can be easily accomplished by first subjecting the titanium ore to oxidation-roasting, then admixing to the oxidation-roasted titanium ore a reducing agent in an amount corresponding to the oxygen content in the titanium ore and the reaction gas; feeding the mixture into a fluidized bed of the above-mentioned titanium ore in the chlorination furnace to cause preferential chlorination of the iron in the ore in a state immediately prior to commencement of the chlorination reaction of titanium; simultaneously introducing into the reaction furnace a quantity of chlorine corresponding to an expected production quantity of ferric chloride; thereafter continuously taking out of the chlorination furnace the reacted titanium ore in a state of its containing 4–6% of residual iron as the total iron content therein; leaching the reacted titanium ore by water or diluted acid to remove the residual chlorides; separating, if necessary, the reducing agent such as coke remaining in the leached residue by flotation or electrostatic dressing; and further separating silica and alumina mixed in the leached residue by electrostatic dressing.

In the drawing, a single figure is a graphical representation showing relationship between the adding quantity of coke and the titanium dioxide content before and after the leaching as well as the reaction rate of chlorine.

The present invention will be described in more detail hereinbelow.

When ilmenite or other titanium ore similar thereto is first oxidation-roasted in a fluidized furnace, rotary kiln or any other appropriate roasting furnace at a temperature higher than 850–900° C., while passing therethrough air or other gas containing oxygen, ilmenite, for example, is decomposed into pseudo-brookite and rutile by the following reaction.

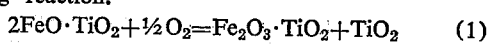
$$2FeO \cdot TiO_2 + \tfrac{1}{2} O_2 = Fe_2O_3 \cdot TiO_2 + TiO_2 \qquad (1)$$

The conditions, under which the reaction proceeds, can be confirmed by continuous heating until the lines of pseudo-brookite and rutile are recognized by powder X-ray method.

As the reactivity of titanium with respect to chlorine is weakened by crystallization of titanium dioxide, the selectivity for chlorination of iron is imparted. In this case, the residual FeO in the oxidized ore becomes less than 0.3%, ordinarily about 0.1%, with the consequence that $FeCl_2$ in the chloride of iron to be produced in the subsequent chlorination step reduces, and possibility of the fluidized bed becoming solidified can be advantageously eliminated.

In the subsequent chlorination step, a reducing agent, such as, for example, calcined oil-coke pulverized to a fine particle size of smaller than 20 mesh is mixed in the aforementioned oxidized ore at a rate of 12–17% to the oxidized ore. The mixture is then continuously charged into the chlorination furnace, and, while introducing chlorine in a quantity corresponding to an expected production quantity of ferric chloride, the iron content in the ore is chlorinated and evaporated in accordance with the following equation.

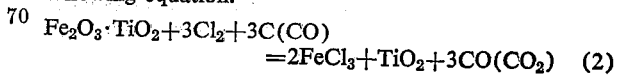
$$Fe_2O_3 \cdot TiO_2 + 3Cl_2 + 3C(CO)$$
$$= 2FeCl_3 + TiO_2 + 3CO(CO_2) \qquad (2)$$

When oxygen is present in the chlorine gas, or when the iron content in the oxidized ore is high, it is necessary to add surplus coke equivalent thereto. The chlorination furnace should be more preferably a fluidized furnace and the temperature in the furnace interior is 800 to 1,000° C. It has been found that chlorination of titanium commences when the iron content of the ore in the furnace is reduced to below 4%. Accordingly, it is desirable that the iron content of the ore in the furnace be maintained more than 4%, or preferably in the range of 4–6%. Most of the titanium chloride produced is titanium tetrachloride. When this compound is produced and comes into the waste-gas treatment step together with iron chloride gases, it moistens the solid chloride of iron to be deposited. This makes it difficult to handle the substance and, at the same time, a complicated separating equipment becomes necessary to prevent the titanium content from mixing into the chloride of iron, which increases the possibility of chlorine and titanium losses. As the result, it is more advantageous that the iron content in the furnance be kept at any rate within the range of 4–6%. In this connection, if an attempt is made to maintain the iron content in the furnace within the specified range of 4–6% under conditions other than those aforementioned such as, for example, reduction in adding quantity of coke or a temperature lower than the optimum temperature, the reaction rate of chlorine lowers and free chlorine in the waste gas increases. This inevitably brings about considerable technological difficulties and economic burden to recover the free chlorine. On the contrary, even if an attempt is made by increasing the adding quantity of coke and by operating at a temperature higher than the optimum level while stoichiometrically regulating the chlorine quantity to be introduced, titanium is simultaneously chlorinated for a considerable part to deteriorate the preferential reactivity of chlorine with iron.

A part of the evaporated $FeCl_3$ is adsorbed to the titanium ore overflown from the fluidized bed, and also partially produced $FeCl_2$, residual $MnCl_2$ remaining without being evaporated, unreacted coke, and so forth are present in the ore, so that the ore contains 85 to 92% $TiO_2$, ordinarily about 87–90%, and 4–6% iron as aforementioned. About a half of this iron content is unreacted iron oxide, hence the adding quantity of coke fluctuates in accordance with the operating conditions. It is, however, in a range of from 1 to 5%, ordinarily 2 to 3%.

A major part of the chlorides in the abovementioned ore is leached when the ore taken out of this chlorination furnace is put in water having an acidity sufficient to suppress hydrolysis of iron, etc., or in mineral acid such as about 10–20% hydrochloric acid or sulfuric acid. In this consequence, the grade of $TiO_2$ in the leached residue increases by about 4% to attain its improved grade of about 90% or so.

The leaching temperature is preferably about 80° C. Also, it is desirable that the ore taken out of the furnace be cooled down to 100° C. or so to prevent the leaching liquid from splashing. The leached residue is rinsed in a suitable washing vessel such as Pachuca tank, etc. to remove the acid adhered thereto. Since the ore even after it is rinsed still contains coke as aforementioned, it is sent into a flotation machine to carry out flotation by adding a foaming agent such as, for example, methyl iso-butyl carbinol at a rate of 300 to 500 grams per ton of the ore, and, if necessary, by adding a proper quantity of a collector such as kerosene, etc.

After it is subjected to flotation, the ore is dried at a proper temperature. If the flotation for removing the coke is omitted, electrostatic dressing of the ore is carried out to separate silica, alumina, coke, etc. The drying temperature is preferably higher than 800° C. to further improve separability of $SiO_2$, $Al_2O_3$, etc. in the electrostatic dressing step. It has been confirmed by analysis in accordance with the powder X-ray method that crystallization of rutile is accelerated at a temperature higher than 800° C., which fact is deemed to be the cause for the improved separability. Since the heating for this crystallization can also be carried out in the oxidation-roasting step which is done prior to the chlorination step, meating at a high temperature is not positively needed in the drying step, although further improvement in the separability is recognized by the high-temperature drying. Also, even in the case of no oxidation-roasting being conducted, as a high temperature heating is carried out in the chlorination step, separability of $SiO_2$ and $Al_2O_3$ can be secured. On account of this, $SiO_2$, $Al_2O_3$, etc., which have been hardly removable by electromagnetic separation or electrostatic dressing adopted in ilmenite mines, can be very easily separated in the course of the preferential chlorination step. This fact characterizes the combination of the chlorination step, rinsing step, and ore-dressing step, and underlies the fundamental construction of the present invention, wherein an improvement in the ore grade can be accomplished with economic and technical advantages.

In the electrostatic dressing, both $SiO_2$ and $Al_2O_3$ can be separated by making the high-tension electrode in negative polarity, so that they attach to the roll, while $TiO_2$ repulses from the roll. In order to attain effective separation, a potential of 15,000 volts is necessary. $Al_2O_3$ can be separated at a voltage lower than 15,000 volts. In this case, if coke co-exists, it is strongly repulsed and can be easily separated. The separation of coke may also be done separately from $SiO_2$ and $Al_2O_3$ at a voltage of about 4,000 v. in a different step.

Next, it is desirable from an economic standpoint that the waste gas which is produced in the chlorination furnace and contains therein $FeCl_3$, CO, $CO_2$, and so forth, be passed through a reproduction and recovery step for chlorine gas.

The waste gas produced in the chlorination furnace contains $FeCl_3$, CO, $CO_2$, etc., mostly produced in accordance with Equation (2), and some amount of $N_2$, $FeCl_2$, $Cl_2$, etc. mixed therein due to leakage or other reasons. Dust is also contained which can be collected by suitable equipment such as cyclone, etc., and the gas is repeatedly fed into the chlorination furnace, or is disposed of in a different way.

Thereafter, when the gas is cooled to 300° C. or below by passing it through a cooling tower, chloride of iron in the gas is turned into solid $FeCl_3$ in accordance with the following equation.

$$FeCl_3 \text{ (gas)} \rightarrow FeCl_3 \text{ (solid)} \qquad (3)$$

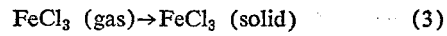

The gas, from which dust and $FeCl_3$ have been removed, consists mainly of CO and $CO_2$ and is exhausted outside after having been treated by heretofore-known methods such as neutralization, and so forth.

The solid iron chloride thus deposited is separated in a settling tank, and is sent to an oxidation furnace together with oxygen or a gas containing oxygen, so that reproduction of chlorine may be carried out in accordance with the following equation.

$$2FeCl_3 + 3/2 O_2 \rightarrow Fe_2O_3 + 3Cl_2 \qquad (4)$$

The iron oxide powder produced by oxidation of the iron chloride in the oxidation furnace is separated by a suitable equipment, and the chlorine is recycled to the fluidized furnace.

Many methods have been proposed with respect to the reproduction process of chlorine gas, hence the above statement is not the subject matter of this invention.

As stated in the foregoing, the present invention is characterized in comprising steps of first oxidizing raw material ilmenite ore to convert the iron content therein to trivalent; then mixing the thus oxidized ore with a proper quantity of coke corresponding to the iron content therein as well as the oxygen content in a reaction gas; subsequently charging the mixture into a reaction furnace to carry out chlorination of the iron content in a state immediately prior to commencement of chlorination of titanium, in other words, by maintaining the iron content of the ore in the reacting bed within the range of 4 to 6%; taking out of the reaction furnace the reacted ore which contains the abovementioned residual iron content; further subjecting this ore to the process steps of rinsing, flotation, and electrostatic dressing to remove iron, coke, silica, alumina, and so forth.

The effects of the present invention are described hereinbelow.

(1) The oxidation-roasting weakens the reactivity of titanium in ilmenite with chlorine to accelerate the preferential chlorination of iron, and, at the same time, improves the separation of iron in the course of the electrostatic dressing.

(2) By maintaining the iron content of the ore in the reaction bed in the chlorination furnace within a range of 4–6%, the chlorination of titanium can be suppressed and, at the same time, the reactivity of the iron with chlorine can be increased, whereby the waste gas treating equipment can be simplified.

(3) Unlike the methods for increasing the ore grade by means of the chlorination process alone, improvement in the ore grade can be accomplished more easily from the technical standpoint as well as more advantageously from the economical standpoint by combining simple equipments for washing and dressing with the chlorination furnace.

(4) By the oxidation-roasting, chlorination-roasting, and, if necessary, high-temperature heating in the drying process, it becomes possible to give sufficient separability to $SiO_2$, $Al_2O_3$, etc. which were difficult to be separate in the ore dressing step, whereby the so-called low-grade ore containing therein a large amount of $SiO_2$, $Al_2O_3$, etc. can be treated, and the range of raw material titanium ores to be treated can be broadened.

(5) Titanium concentrate of 95% $TiO_2$ or above and having a good outer appearance can be obtained.

In order to enable the skilled persons in the art to reduce the present invention into practice, the following preferred examples are presented. It should, however, be noted that the invention is not limited to these examples alone, but any change may be made within the scope of the invention as set forth in the appended claims.

EXAMPLE 1

Ilmenite of a composition containing 53.3% $TiO_2$, 20.4% FeO, and 19.8% $Fe_2O_3$ was oxidation-roasted for one hour at each temperature of 900° C. and 650° C., while fluidizing the same by air, to form an oxidized ore. This oxidized ore was then mixed with calcined oil-coke pulverized to fine particle size of smaller than 20 mesh at a mixing ratio of 15% by weight with respect to the oxidized ore. This mixture was further blended with the concentrated titanium ore previously obtained by removing iron from the above mentioned ilmenite, the total iron content in the blend being adjusted to 10%. This blended ore was charged into a fluidized chlorination reaction tube of a 5 cm. in diameter, into which chlorine was blown at a rate of 2 liters per minute to chlorinate preferentially the iron content in the blended ore at 900° C. This preferential chlorination was continued from the beginning of the chlorination of titanium up to a point where white smoke of titanium chloride could be observed in the exhaust gas from the reaction tube.

Subsequently, the abovementioned blended ore was once charged into the reaction tube and taken out again therefrom immediately before commencement of the chlorination reaction of titanium contained in the ore and the leached residue after the abovementioned blended ore was further placed in water, the pH value of which was made 1 by use of hydrochloric acid, and was stirred for 30 minutes to let the residual chlorides exude were compared for their analytical values, the results being shown in the following Table 1. The reaction rate of chlorine was determined by analyzing the exhaust gas from the reaction tube by means of gas-chromatography.

TABLE 1

| Temperature for oxidation-roasting | 650° C. | 900° C. |
|---|---|---|
| Before HCl leaching: | | |
| $TiO_2$ (percent) | 86.2 | 88.5 |
| Total Fe (percent) | 5.5 | 4.5 |
| After HCl leaching: | | |
| $TiO_2$ (percent) | 90.1 | 92.1 |
| Total Fe (percent) | 3.7 | 2.2 |
| Reaction rate of chlorine (percent) | 97.7 | 98.0 |

As Table 1 above shows, in the state just before the chlorination of titanium starts, the quantity of unreacted iron oxide remaining in the leached residue after the HCl leaching is 3.7% in terms of the total Fe when the oxidation-roasting temperature is at 650° C., and 2.2% at 900° C. This fact clearly shows that selectivity of the chlorination reaction depends on the oxidation-roasting temperature in the pretreatment step.

EXAMPLE 2

To the titanium ore which has been oxidation-roasted at 900° C. as in Example 1 above, there was added calcined oil-coke pulverized to a particle size of smaller than 20 meshes at respective weight ratios of 5, 10, 15, 20, and 30% with respect to the oxidized ore, and each of the mixture was continuously charged into a fluidizing chlorination reaction tube having 5 cm. in diameter.

The blowing quantity of chlorine into the reaction tube was set at a constant rate of 2 liters per minute. The staying time of the ore in the reaction tube was adjusted by changing the feeding rate. In the same way as in Example 1, the preferential chlorination was continued until commencement of chlorination reaction of titanium. In Table 2, there is shown relationship between the adding quantity of coke and the total quantity of Fe remaining in the ore within the reaction tube, the grade of titanium as well as the reaction rate of chlorine blown thereinto.

TABLE 2

| Adding quantity of coke (percent) | Before HCl leaching (percent) | | After HCl leaching (percent) | | Reaction rate of chlorine (percent) |
|---|---|---|---|---|---|
| | $TiO_2$ | Total Fe | $TiO_2$ | Total Fe | |
| 5 | 89.5 | 3.2 | 93.4 | 1.5 | 20.3 |
| 10 | 86.2 | 4.8 | 90.5 | 2.7 | 31.0 |
| 15 | 87.5 | 4.5 | 91.6 | 2.5 | 98.4 |
| 20 | 80.2 | 8.2 | 84.5 | 6.0 | 99.3 |
| 30 | 78.5 | 9.8 | 82.4 | 8.2 | 99.1 |

Table 2 above can be shown graphically as the accompanying drawing. Table 2 indicates that, when the adding quantity of coke is 15%, for example, the total Fe content of the ore in the reaction tube prior to the HCl leaching is 4.5%, and that, by taking out of the reaction tube the ore containing 2.5% of Fe remaining in the form of unreacted iron oxide, the reaction rate of chlorine can be maintained at approximately 98%. When a continuous operation under this condition was carried out for 5 hours, the grade of the concentrated titanium ore overflown from the reaction tube was 87.5% $TiO_2$, and the leached residue after the concentrated ore has been leached with HCl contained 91.6% $TiO_2$. Incidentally, $FeCl_3$ contained in the waste gas from the reaction tube was separated in a settling-an-cooling tank. No wetting could be recognized at all in this $FeCl_3$ due to $TiCl_4$. This fact signifies that the compound was in a state of being easily transported pneumatically.

EXAMPLE 3

To ilmenite of a composition containing 53.1% $TiO_2$, 27.9% FeO, 10.6% $Fe_2O_3$, 2.40% $SiO_2$, 1.28% $Al_2O_3$, and 3.74% MnO, calcined oil-cake pulverized to a particle size of smaller than 20 meshes was added, and the mixture was fluidized at 900° C. by blowing chlorine gas thereinto. Concentrated titanium ore taken out of that fluidized bed by overflow was composed of 87.03% $TiO_2$, 4.68% total Fe, and 1.52% coke. This titanium concentrate was leached by water, the pH value of which was made 1 by use of HCl; 20% HCl; and 10% $H_2SO_4$, respectively, at each temperature of 25° C. and 80° C. for 30 minutes. The results of the treatment are as shown in the Table 3 below, from which it is understood that the grade of titanium has improved by about 4% and the leached residue contains 91% $TiO_2$ and 2.3% total Fe.

TABLE 3

| Grade | Leaching temperature | | | |
|---|---|---|---|---|
| | 25° C. | | 80° C. | |
| | $TiO_2$ (percent) | Total Fe (percent) | $TiO_2$ (percent) | Total Fe (percent) |
| Water, pH=1 | 90.52 | 3.01 | 91.23 | 2.23 |
| 20% HCl | 91.05 | 2.78 | 91.31 | 2.17 |
| 10% $H_2SO_4$ | 91.13 | 2.94 | 92.08 | 2.58 |

EXAMPLE 4

Ilmenite of a composition containing 53.0% $TiO_2$, 20.4% FeO, 19.8% $Fe_2O_3$, 1.63% MnO, 1.68% $SiO_2$, and 1.41% $Al_2O_3$ was oxidation-roasted at 900° C. for one hour to form an oxidized ore containing 0.06% residual FeO. This oxidized ore was preferentially chlorinated under the same condition as in Example 3 above, and the concentrated titanium ore overflown was leached by 20% HCl to obtain a leached residue containing 91.26% $TiO_2$, 1.81% total Fe, and 3.71% coke. Subsequently, by using a small-sized Denver-type flotation machine, flotation was carried out on 150 g. of the leached residue for 2 minutes by addition of 12 mg. of methyl isobutyl carbinol as a foaming agent and for another 2 minutes with 8 mg. of the same added thereto. As the result, 5.2 g. of coke was floated, and ore containing 93.55% $TiO_2$ was gained as precipitate.

EXAMPLE 5

The ore of Example 1 was oxidation-roasted to make the residual FeO therein to be 0.6%. Thereafter, calcined oil-coke pulverized to a particle size of smaller than 20 mesh was mixed with the oxidized ore at a mixing rate of 18% by weight to the total quantity of the ore. The mixture was then charged continuously into a fluidized reactor of 40 cm. diameter at a rate of 1 kg. per minute and, at the same time, chlorine recovered from a chlorine recovery chamber was blown into the reaction furnace together with supplemental quantity of chlorine at a rate of 200 liters per minute to react with the ore at 900° C.

The reaction rate of chlorine determined by the analytical value of the waste gas was 93.8%. Formation of $TiCl_4$ was the least, which caused no obstacle at all in handling the ferric chloride separated in a settling tank. The reacted ore which was taken out of the furnace at an average rate of 650 g. per minute was found to contain 86.7% $TiO_2$ and 5.3% Fe. When this ore was washed with water of pH=1 to remove the chloride content, and dried, the $TiO_2$ content increased to 89.5%.

Subsequently, the ore was placed in an electrostatic dressing machine, and a potential of 9,000 v. was applied with the high-tension side being made negative polarity. As a result of this, about 13 g. of coke was separated from 1 kg. of sample. Further, a potential of 15,000 v. was applied repeatedly to separate $SiO_2$ and $Al_2O_3$. The finally obtained titanium concentrate was composed of 94.8% $TiO_2$, 2.47% Fe, 0.26% Mn, 0.52% $SiO_2$, and 0.29% $Al_2O_3$.

What we claim is:

1. In a method for producing a titanium concentrate from an ilmenite ore in which said ore is subjected to chlorination by means of gaseous chlorine in the presence of carbon in a fluidized bed at an elevated temperature whereby the iron content of the ore is chlorinated into ferric chloride which is evaporated off at the elevated temperature while the titanium remains substantially unchlorinated, the improvement which comprises the combination of the steps of:

(1) subjecting said ore, prior to said chlorination, to oxidation-roasting at a temperature which is at least about 850° C. thereby to decompose the ilmenite into pseudo-Brookite and rutile;
   (2) conducting said chlorination by means of gaseous chlorine in the presence of carbon in a fluidized bed to the extent that the iron content is reduced to from 4 to 6% of the reacted ore; and
   (3) withdrawing from the chlorination step, the thus-reacted ore with its iron content of from 4 to 6%.

2. The improvement as claimed in claim 1, wherein said carbon is calcined oil coke of a particle size of smaller than 20 mesh.

3. The improvement as claimed in claim 1, wherein the reacted ore is subjected to leaching with a medium selected from the group consisting of water and diluted acids to remove residual chlorides wherein the titanium content in the reacted ore remain unleached.

4. The improvement as claimed in claim 3, wherein the diluted acid for leaching is selected from the group consisting of hydrochloric acid and sulfuric acid in concentration of from 10 to 20%.

5. The improvement as claimed in claim 1, wherein the carbon which has been added in excess to the ilmenite ore is removed by means of flotation.

6. The improvement as claimed in claim 1, wherein the carbon which has been added in excess to the ilmenite ore and is contained in the reacted ore is removed by means of electrostatic dressing at a voltage of at least about 4,000 volts.

7. The improvement as claimed in claim 1, wherein mineral gangs comprising silica and alumina which have been contained in the ilmenite ore are removed by means of electrostatic dressing at a voltage of at least 15,000 volts.

References Cited

UNITED STATES PATENTS

| 2,758,019 | 8/1956 | Daubenspeck et al. | 423—75 X |
| 3,228,751 | 1/1966 | Iiani | 423—75 X |
| 2,954,278 | 9/1960 | Gaskin et al. | 423—80 |
| 2,183,365 | 12/1939 | Booge | 423—75 |
| 3,627,508 | 12/1971 | Norton et al. | 423—75 |

HERBERT T. CARTER, Primary Examiner

U.S. Cl. X.R.

75—1; 423—75, 80, 82, 86